United States Patent

Lockhart et al.

Patent Number: 6,161,207
Date of Patent: Dec. 12, 2000

[54] COMMUNICATIONS UNIT AND METHOD OF COMMUNICATING HAVING EFFICIENT PACKET ACKNOWLEDGEMENT

[75] Inventors: Thomas Wayne Lockhart, Richmond; Karl Anthony Reardon, Surrey, both of Canada

[73] Assignee: Motorola, Inc., Schaumburg, Ill.

[21] Appl. No.: 08/749,577

[22] Filed: Nov. 15, 1996

[51] Int. Cl.[7] ............... H04J 3/24; H04L 1/18; H03M 13/00; G08C 25/02

[52] U.S. Cl. ............ 714/758; 714/748; 714/749; 714/750; 370/473; 370/474; 370/475

[58] Field of Search ............ 235/472; 375/1, 375/200; 714/748, 750, 749, 758; 370/389, 471, 472, 473, 474, 476, 475

[56] References Cited

U.S. PATENT DOCUMENTS

| | | | |
|---|---|---|---|
| 4,074,232 | 2/1978 | Otomo et al. | 714/750 |
| 4,082,922 | 4/1978 | Chu | 370/230 |
| 4,745,599 | 5/1988 | Raychaudhuri | 370/348 |
| 5,027,356 | 6/1991 | Nakamura et al. | 714/748 |
| 5,029,183 | 7/1991 | Tymes et al. | 375/1 |
| 5,103,461 | 4/1992 | Tymes et al. | 375/1 |
| 5,245,616 | 9/1993 | Olson | 371/32 |
| 5,479,441 | 12/1995 | Tymes et al. | 375/200 |
| 5,499,247 | 3/1996 | Matsuda et al. | 370/445 |
| 5,528,621 | 6/1996 | Heiman et al. | 375/200 |
| 5,553,067 | 9/1996 | Walker et al. | 370/390 |
| 5,553,083 | 9/1996 | Miller | 371/32 |
| 5,608,738 | 3/1997 | Matsushita | 714/752 |
| 5,664,091 | 9/1997 | Keen | 395/185.02 |
| 5,668,803 | 9/1997 | Tymes et al. | 370/312 |
| 5,727,002 | 3/1998 | Miller et al. | 371/32 |
| 5,742,644 | 4/1998 | Campana, Jr. | 375/316 |
| 5,764,646 | 6/1998 | Dent | 370/479 |
| 5,889,767 | 3/1999 | Kimura | 370/314 |
| 5,995,554 | 11/1999 | Lang | 375/295 |
| 6,005,871 | 12/1999 | Petersen et al. | 370/474 |

OTHER PUBLICATIONS

"Applied Data Communications; a business–oriented approach" by James E. Goldman, p. 75, John Wiley and Sons Inc., 1995.

*Primary Examiner*—William Grant
*Assistant Examiner*—Iván Calcano
*Attorney, Agent, or Firm*—Charles W. Bethards

[57] ABSTRACT

A communications unit (10) with a packet subdivider operable on a data packet (200) and an error detecting code generator. An acknowledgement message (NAK) is generated including error detecting code corresponding to packet portions (210–204) from the packet subdivider, thereby requesting retransmission of packet portions. At an originating unit (100) an error detection code is computed for each portion. The computed second error detection code for each sub-portion is compared with the received first error detection code for that portion. Portions for which corresponding error detection codes do not match are identified as bad portions and are retransmitted (220).

13 Claims, 7 Drawing Sheets

COMMUNICATIONS UNIT AND METHOD OF COMMUNICATING HAVING EFFICIENT PACKET ACKNOWLEDGEMENT

FIELD OF THE INVENTION

This invention relates to a communications unit such as a packet data radio and a method of acknowledgment for data retransmission.

BACKGROUND OF THE INVENTION

With increasing interest in packet data networks, and particularly wireless packet data networks, and with the increased use of packet data or electronic mail, transfer of data files, web browsing, digitized voice and video, more and more attention is being turned to the efficiency of such systems.

One aspect of such efficiency is the extent to which retransmission of data packets is required. When a data packet is corrupted in transit and needs to be retransmitted, it is retransmitted with a granularity which is determined by the structure of error detection information in the original packet. Some data protocols have a low degree of cyclical redundancy code (CRC) coding and must be transmitted in their entirety, where others have a high degree of CRC coding and allow much smaller degrees of retransmission. For example, a data packet such as a DataTAC™ protocol data unit or packet data unit (PDU) contains a single data CRC amounting to about one percent of the total packet size. When retransmission is required, the entire PDU must be retransmitted. Such a system is very efficient over a reliable channel, because of the low degree of redundant data. Efficiency falls away when extensive retransmission is necessary. By contrast, a Mobitex™ packet data system has two bytes of CRC every 18 data bytes amounting to ten percent of a total packet. In such a system, a portion of a complete packet can be retransmitted in the event of an error. Such a system has a high overhead but low retransmission cost and is less efficient when there is a good connection and more efficient when the channel is poor.

There is a need for an improved packet data communication system which is more efficient overall in a wide range of conditions.

DETAILED DESCRIPTION OF THE DRAWINGS

Figure 1:
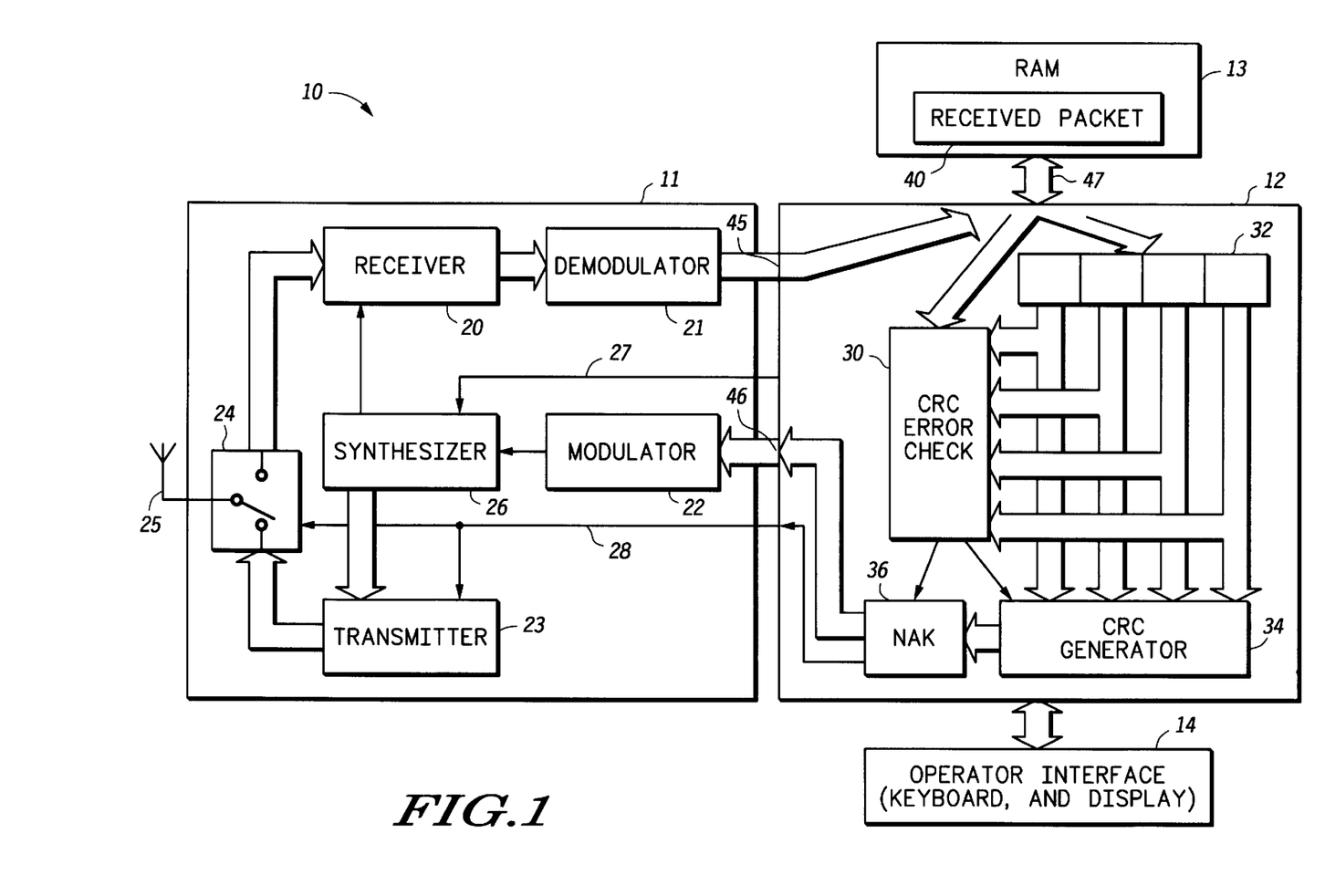
FIG. 1 is a block diagram of a communications unit in accordance with the present invention, illustrating elements involved in reception of packet data.

Referring to FIG. 1, a communications unit 10 is shown comprising a radio transceiver 11 coupled to a processor 12 having random access memory (RAM) 13 and an optional operator interface 14, which may include a keyboard and a display.

The radio transceiver 11 comprises a receiver 20 coupled to a demodulator 21, and a modulator 22 coupled to a transmitter 23. The receiver 20 and transmitter 23 are coupled to an antenna switch 24, to which is connected an antenna 25. A synthesizer 26 is illustrated coupled to the modulator 22, the receiver 20 and the transmitter 23. The synthesizer 26 is shown as having a control line 27 coupled to the processor 12. The synthesizer 26 is provided for multi-frequency operation, the frequency of operation being selected via the control line 27, but it is to be understood that synthesizer 26 is optional. A further control line 28 extends from the processor 11 to the antenna switch 24 and the transmitter 23. This control line 28 is a transmit key-up control line.

The processor 12 has a number of functions implemented in software.

In FIG. 1, certain functions involved in reception of data packets are illustrated. These include a cyclical redundancy check (CRC) error check function 30, a packet divider function 32, a CRC generator function 34, and a negative acknowledgment message generator function 36. The RAM memory 13 is shown as having a memory space 40 for a received data packet.

The processor 12 is shown having an input 45 and an output 46. A bus 47 connects the processor 12 to the RAM 13. Various connections are shown between the various functions within the processor 12, which are best understood from a description of the operation of the communications unit.

In operation, a packet data unit (PDU) is received via the antenna 25 at receiver 20 (antenna switch 24 being in its receive position) and the PDU is demodulated by demodulator 21 and presented to the processor 12 at the input 45. The processor 12 passes the received PDU over bus 47 to the memory space 40. CRC error checker 30 extracts the complete packet from memory space 40 and performs an error check function on the packet, in a manner known in the art. The error check function uses CRC error code contained within the PDU. If the received packet contains no errors, it is retained in memory space 40, for presentation on interface 14 or for other purposes, such as passing to a higher level application. If CRC error check function 30 determines that there is an error in the received packet, packet divider 32 extracts sub-portions of the packet. The sub-portions are preferably four equal portions of a complete packet.

In the case of a DataTAC™ PDU, the PDU is an integral number of 12 byte blocks (octets) minus 4 bytes, which is readily divisible into four equal portions. These portions are individually passed to CRC generator 34, which generates separate CRC code for each portion of the PDU. Each separate CRC code comprises eight bits. These four CRC codes are passed by CRC generator 34 to negative acknowledgment (NAK) generator 36, which generates a negative acknowledgment message, which includes the four CRC codes, and passes this message to the output 46. At an appropriate time, message generator 36 provides a key-up signal on control line 28 and the negative acknowledgment message is transmitted by the transmitter 23 over the antenna 25.

Figure 2:
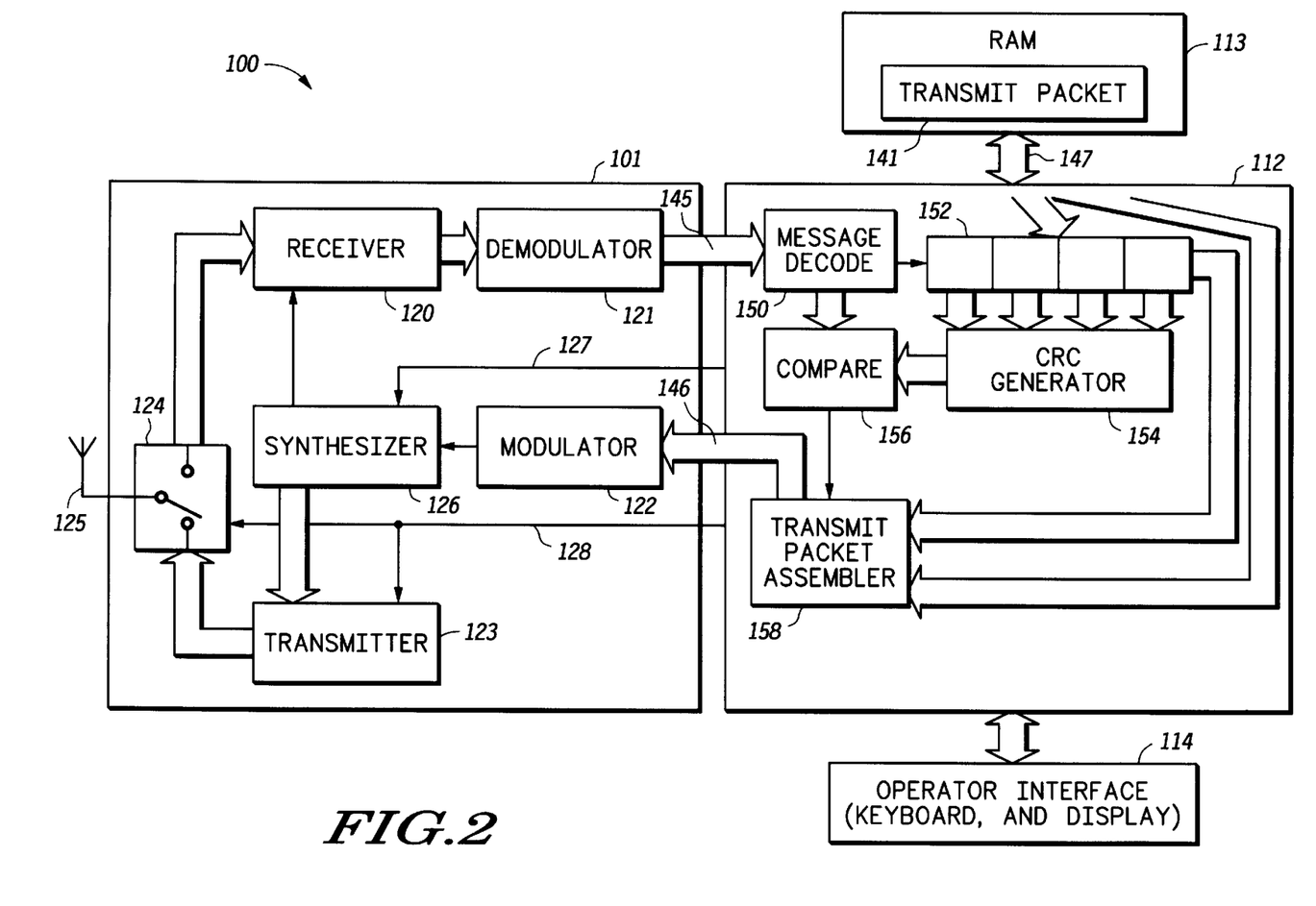
FIG. 2 is a block diagram of a communications unit similar to that of FIG. 1, illustrating elements involved in transmission of packet data.

The negative acknowledgment message is received by the communications unit 100 of FIG. 2, which has the same or similar elements as the communications unit of FIG. 1. Radio transceiver 101 is identical to radio transceiver 11, processor 112 is identical to processor 12 and RAM 113 and interface 114 are identical to RAM 13 and interface 14 respectively, however certain elements illustrated in the processor 12 and the RAM 13 in FIG. 1 are not shown in the processor 112 and the RAM 113 in FIG. 2 and certain elements illustrated in the processor 112 and the RAM 113 in FIG. 2 are not shown in the processor 12 and RAM 13 in FIG. 1. Elements 120–128 and 145–147 of FIG. 2 are identical to elements 20–28 of FIG. 1.

The processor 112 is shown as comprising a number of functions implemented in software. These include a message decode function 150, a packet divider function 152, a CRC generator function 154, a compare function 156 and a transmit packet assembler function 158. The RAM 113 is shown as having a memory space 141 for a transmit data packet.

In operation, the negative acknowledgment message transmitted by the communications unit of FIG. 1 is received by the receiver 120, demodulated in demodulator 121 and decoded in message decode function 150. Message decode function 150 decodes the message and identifies it as a NAK message and in response thereto activates packet divider function 152. Packet divider function 152 extracts from transmit packet memory space 141 in RAM 113 the original packet which was previously transmitted (in a manner well-known in the art) to communications unit 10 of FIG. 1. Packet divider function 152 divides the PDU from memory space 141 into sub-portions in the same manner as the received packet in communications unit 10 was divided into sub-portions.

Thus, in the preferred embodiment, the transmit PDU is divided into four equal portions. CRC generator function 154 generates CRC code for each of the sub-portions. Compare function 156 compares the CRC code received in the NAK message from message decode function 150 with the CRC code generated in CRC generator 154. Compare function 156 performs this comparison for each sub-portion. In this manner, compare function 156 is able to identify (with a given level of confidence) which sub-portions of the original PDU were received by communications unit 10 correctly and which sub-portions were received with errors.

In response to compare function 156 transmit packet assembler 158 assembles a new packet for transmission. The new packet for transmission contains only those sub-portions of the original PDU which compare function 156 identifies as having been received by communications unit 10 with errors. Transmit packet assembler assembles this retransmission packet and provides it to modulator 122 over output 146. Modulator 122 modulates a signal from synthesizer 126 which is transmitted by transmitter 123 through antenna 125 back to communications 10. Communications unit 10 (FIG. 1) is then able to take the retransmitted packet and assemble a complete received PDU placing the newly received sub-portions in place of the original sub-portions in memory space 40.

Figure 3:
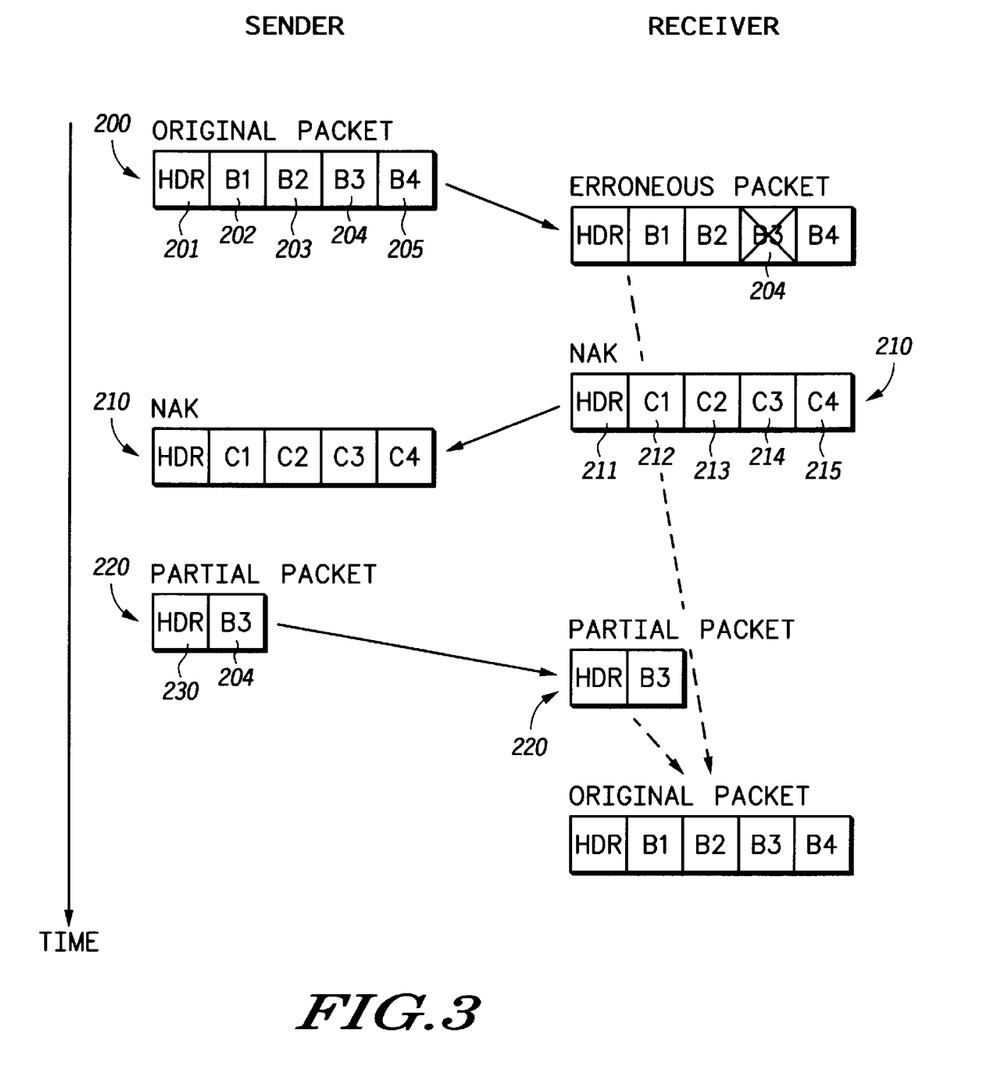
FIG. 3 is a messaging diagram illustrating messages being exchanged between the communications unit of FIG. 1 and that of FIG. 2.

The above-described operation is illustrated in FIG. 3. In FIG. 3, a sender (communications unit 100 of FIG. 2) generates an original packet 200 comprising a header 201 and a number of sub-portions. In the example illustrated, there are four equal sub-portions 202, 203, 204 and 205. This PDU is transmitted by communications unit 100 to a receiver, for example, communications unit 10 of FIG. 1. At the receiver, the case is illustrated where the third sub-portion 204 contains one or more errors. The receiver communications unit does not know which sub-portion of the PDU contains the error, but it is able to perform a CRC check and identify that there is an error in the PDU. The receiver generates an NAK message 210 which has a header 211 and four portions of CRC code 212, 213, 214 and 215. In the illustration, the NAK message 210 is the same length as the original packet 200, but this is a mere illustration and is not to scale. In fact, of course, the NAK message 210 is much shorter than the original packet 200 as it contains only CRC code and does not contain the raw data. The sender receives the NAK package with its CRC code and simultaneously generates CRC code for each of the original portions 202, 203, 204 and 205. It compares the received CRC code with the generated CRC code and identifies which sub-portions of the packet where erroneously received. It identifies that sub-portion 204 was received with errors and it resends in a partial packet 220 just the erred sub-portion 204 together with a header 230, which preferably identifies that the packet is a partial packet. The receiver receives the partial packet 220 and assembles the original packet from the originally received portions 202, 203 and 205 plus the newly received portion 204.

The header 230 identifies which sub-portion or sub-portions of the original packet is or are included in the partial packet 220.

Figure 4:
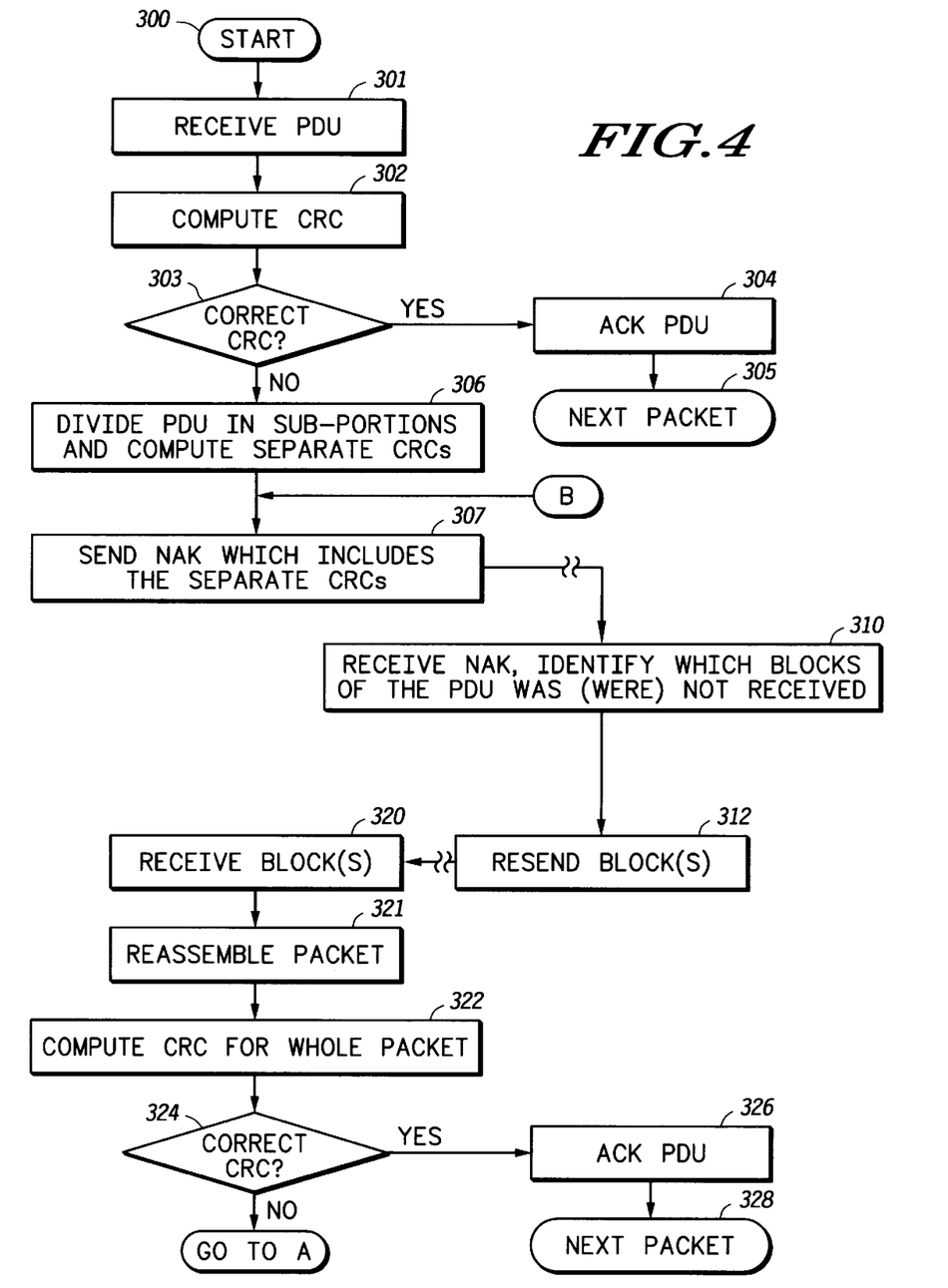
FIG. 4 and 5 are flow diagrams illustrating operation of the communications units of FIGS. 1 and 2.
Figure 5:
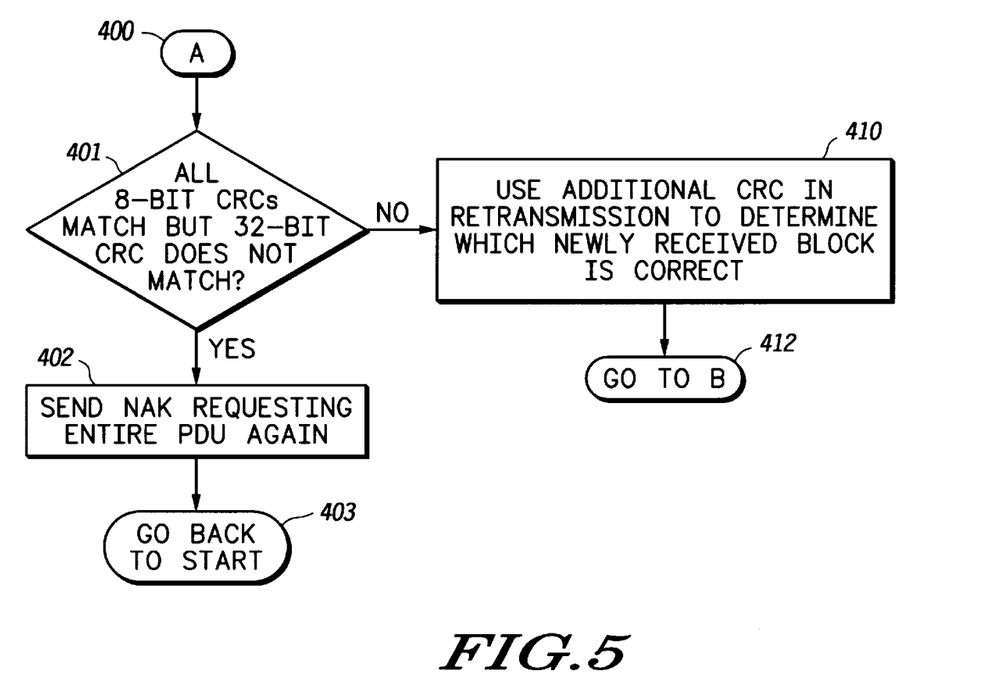

The operation described above is further illustrated in a flow diagram in FIG. 4 and preferred, but inessential, additional details are illustrated in a flow diagram in FIG. 5.

Referring to FIG. 4, steps illustrated in the receiver communications unit 10 are shown on the left hand side of the figure and steps implemented in a transmitter unit 100 are shown on the right hand side.

Steps involved in originally transmitting the packet from the transmitter unit 100 to the receiver unit 10 are standard and are not illustrated in FIG. 4. The process of FIG. 4 starts at step 300 and in step 301 the packet 200 is received by communications unit 10. In step 302, the processor 12 in its CRC error check function 30 computes a CRC for the entire data portion of the received packet. The computed CRC is compared with a received CRC for the pay load in step 303 in a manner well-known in the art. If the entire packet is received correctly, an acknowledgment message is generated in step 304 and transmitted to the transmitting unit in a manner known in the art, where upon the process proceeds to step 305 and the receiver awaits the next packet. If step 303 determines that there is an error in the PDU, the PDU is divided in step 306 into four equal parts and four separate CRCs are computed. Step 304 is performed by functions 32 and 34 of processor 12. Step 307 causes a negative acknowledgment to be generated in NAK generate 36 and this is sent in transmitter 23. The NAK message includes the separate CRCs. In step 310, the transmitter unit 100 receives the NAK message, compare function 156 identifies which sub-portion or sub-portions of the PDU was not or were not received correctly. Note that compare function 156 may identify that all sub-portions check codes are correct. In this case, the entire packet is resent. Step 312 causes transmit packet assembler 158 to assemble and resend those blocks. The resend blocks are received at receiver unit 10 in step 320 and the packet is re-assembled in step 321. The packet is re-assembled by placing the newly received blocks in the appropriate place in received packet memory space 40. In step 322, a CRC is computed for the whole packet as was done in step 302 and if this is correct (i.e. correlates to the originally received CRC), step 324 causes the process to proceed to step 326 and an acknowledgment (ACK) PDU is transmitted in the same manner as was transmitted in step 304. The receiver then awaits the next packet.

If step 324 determines that the CRC generated for the newly re-assembled packet is still not correct, the process proceeds to step 400 in FIG. 5.

From step 400, the process proceeds to step 401 where a comparison of the individual CRCs for the sub-portion, as well as a comparison for the complete CRCs for the whole PDU, are made in processor 12 of the receiver unit 10. If all of the CRCs for all of the sub-portions (8-bit CRCs) match, but the full 32-bit CRC for the entire PDU does not match, the conclusion is reached that the entire process has not put the receiver in a better position for re-assembling the correct packet and a negative acknowledgment message is sent in step 402 requesting the transmitter to send the entire PDU again. The process then returns to the start at step 403. If, on the other hand, step 401 gives the opposite result, i.e. either there is a non-match for the CRCs of one of the sub-portions or there is no match for the complete CRC, the process proceeds to step 410 and processor 12 extracts an additional CRC from partial packet 220 and compares this CRC with the locally generated CRC for the retransmitted sub-portion generated by CRC generator 34. By a comparison between these CRCs, processor 12 is able to determine which newly received portion 204, etc. is correct or which has again been received in error. The process then returns at step 412 to point B in FIG. 4, where step 305 is repeated and an NAK message is sent to allow the transmitter unit 100 to send another partial packet.

Steps 307 through 410 can be repeated several times if necessary, or the process can exit this loop to step 402 after several retries.

A more specific example of implementation of the invention is now given in the context of the radio data link access procedure (RD-LAP) protocol.

When a mobile terminal or a base station receives a PDU, and the computed data CRC does not match the one received in the PDU, it logically divides the PDU (data and pad bytes) into 4 equal pieces (always possible because it in an integral number of 12 byte blocks minus 4 bytes) and computes an 8-bit CRC for each piece. Any reasonable 8-bit CRC will do. The receiver then creates a normal data error response PDU, and places the four previously computed 8-bit CRCs into the 7th, 8th, 9th, and 10th bytes of the response PDU.

When the sender receives the data error response PDU, if any of 7th, 8th, 9th, or 10th bytes are non-zero, it divides the data and pad bytes of the original PDU into four equal pieces and computes the same 8-bit CRC code for each of the pieces. The sender then compares these CRCs with the ones received in the data error response PDU. If they all match or they all fail to match, then the PDU is retransmitted in its entirety, as was previously done for data PDU NAKs. If 1, 2 or 3 block CRCs mismatch, then the sender creates a new data PDU, using a previously reserved control SAP (e.g. service access point (SAP)) which marks the PDU as a selective transmission.

The PDU header is formatted as for a normal data packet (other than the SAP code) but the data format is as follows:

1st byte: reserved (set to 0);

2nd byte: bit map of which 1, 2 or 3 of the 4 blocks are included in this selective retransmission, i.e. 0x08 for the first, 0x04, 0x02, OR'd 0x01 for last;

3rd byte: 8-bit CRC of the first block of the original packet;

4th, 5th, and 6th bytes: the 8-bit CRCs of the 2nd, 3rd, and 4th blocks of the original packet;

7th, 8th, 9th, and 10th bytes are the original 32-bit data CRC.

The data bytes for each of the blocks being retransmitted as indicated in the bit map of the second byte; in the same order as the original PDU, followed by pad bytes and a 32-bit CRC in a similar fashion to normal data PDUs.

Upon receipt of this selective retransmission PDU, the receiver verifies that it is reasonable and then attempts to recreate the original PDU, using the retransmitted blocks and blocks of the original (erroneous) PDU, as indicated by the block CRCs. If the retransmission fails the overall data CRC, i.e. the retransmission is also erroneous, the receiver should use the addition 8-bit block CRCs included in the retransmission to determine which of the newly received blocks may be correct. If it can successfully recreate the original data so that it passes the full data CRC (either the original or the one included in the selective retransmission) then it ACKs the PDU and continue normal processing. IF all the 8-bit block CRCs match but neither of the 32-bit full data CRCs match then it reverts to a normal data NAK requesting the entire PDU again. Or finally, if it still does not have a complete set of correct blocks, per the selective retransmission PDU, it may selectively NAK again, including the correct 8-bit block CRCs for the blocks it has correctly received and the incorrect 8-bit block CRCs for the blocks it still has not correctly received.

Normal retransmission rules with regard to PDU sequence numbers and total number of retransmission attempts can be applied. Ifs either the mobile terminal or the base station does not know how to perform the novel selective retransmission procedures, they can automatically respond with a full retransmission. Thus, the novel mechanism is entirely backward compatible with existing mobile terminals and base stations.

In an enhancement to the above-described arrangement, a receiving unit can request a set of up to three data blocks in a selective NAK, so as to give it a good chance to recover the entire PDU. It must, however, be weary of the case where an erroneous block matches the 8-bit block CRC. For example, if it receives an erroneous data PDU, it selectively NAKs that PDU, gets a single block back and then all four block CRCs match but the full data CRCs do not match, the receiver may either simply NAK with a data error or selectively NAK, corrupting the block CRCs for the blocks it has not received twice the same.

Thus, a novel selective retransmission scheme has been described which provides many of the benefits of selective retransmission without the additional overhead of prior-block error detection codes. Additionally, the novel selective retransmission technique can be retrofitted into an existing data network, such as an RD-LAP system, while remaining backwards compatible.

The arrangement can reasonably be expected to increase the coverage of the data modem by several dB.

Figure 6:
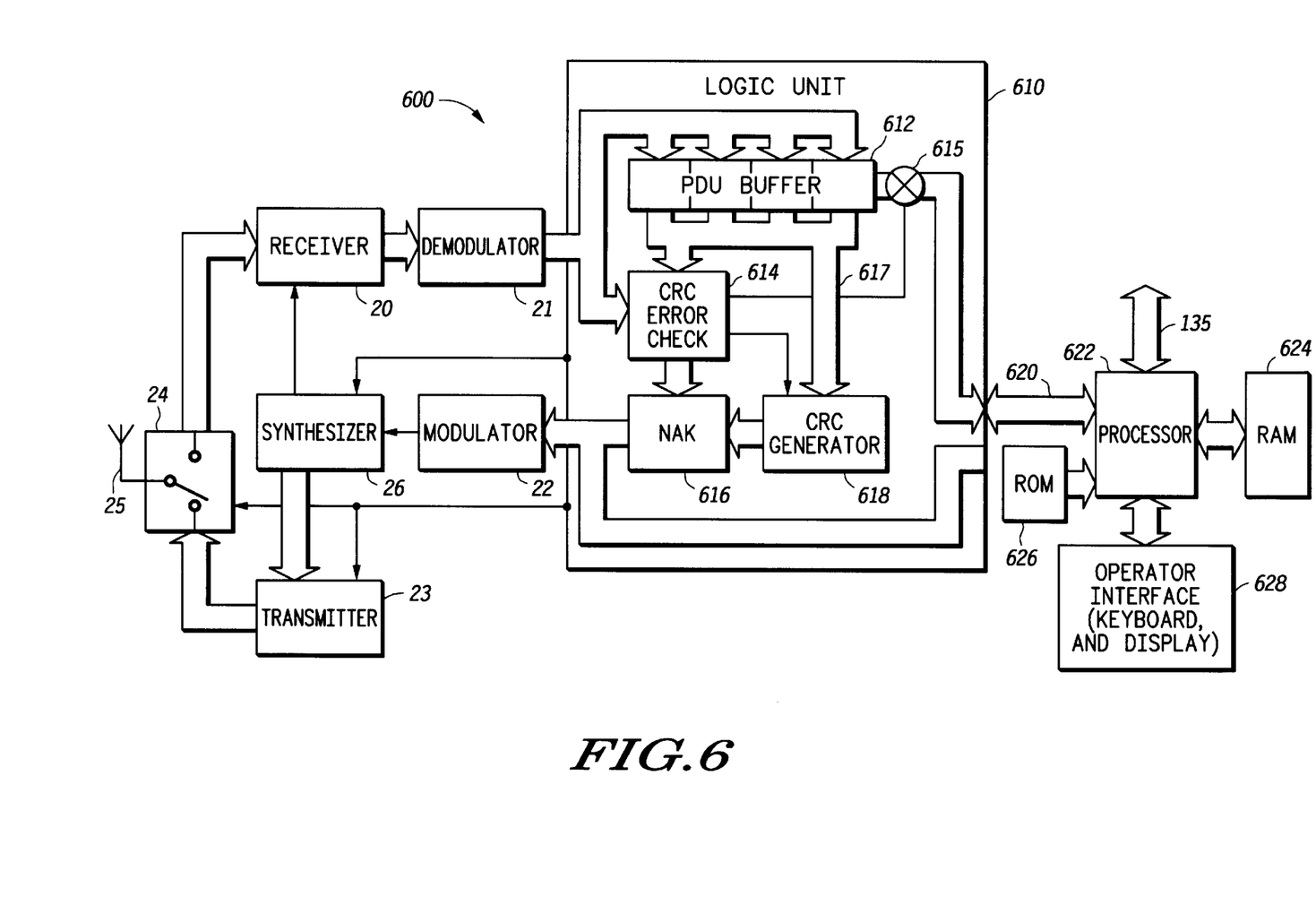
FIG. 6 is an illustration of an embodiment of the invention alternative to the embodiment illustrated in FIG. 1.

Referring now to FIG. 6, an alternative embodiment of a receiver unit similar to that of FIG. 1 is illustrated in this embodiment, elements common to the embodiment of FIG. 1 have the same reference numerals. In this alternative embodiment, certain features previously described as implemented in software are now illustrated as hardware elements. Thus, the communications unit 600 of FIG. 6 comprises a logic unit 610 having packet memory space in the form of a buffer 612 and having a CRC error check circuit 614, an NAK message generator 616 and a CRC generator 618. The logic unit 610 is connected by a bus 620 to a processor 622 having RAM 624, PRO memory 626 and an operator interface 628.

In operation, a PDU is received by receiver 20 and stored in PDU buffer 612. At the same time, CRC error check circuit 614 performs an error check on the PDU and if the PDU is received correctly, a gate 615 is in effect opened and the contents of the buffer are passed over bus 620 to the processor 622 for further processing. If the CRC error check circuit 614 determines that there is an error, it causes CRC generator 618 to extract via bus 617 different sub-portions of the contents of the buffer 612 and CRC generator 618 generates CRC code for each of the sub-portions, passing the results and code to NAK generator 616. NAK generator 616 generates an NAK message and this is transmitted by transmitter 23.

Figure 7:
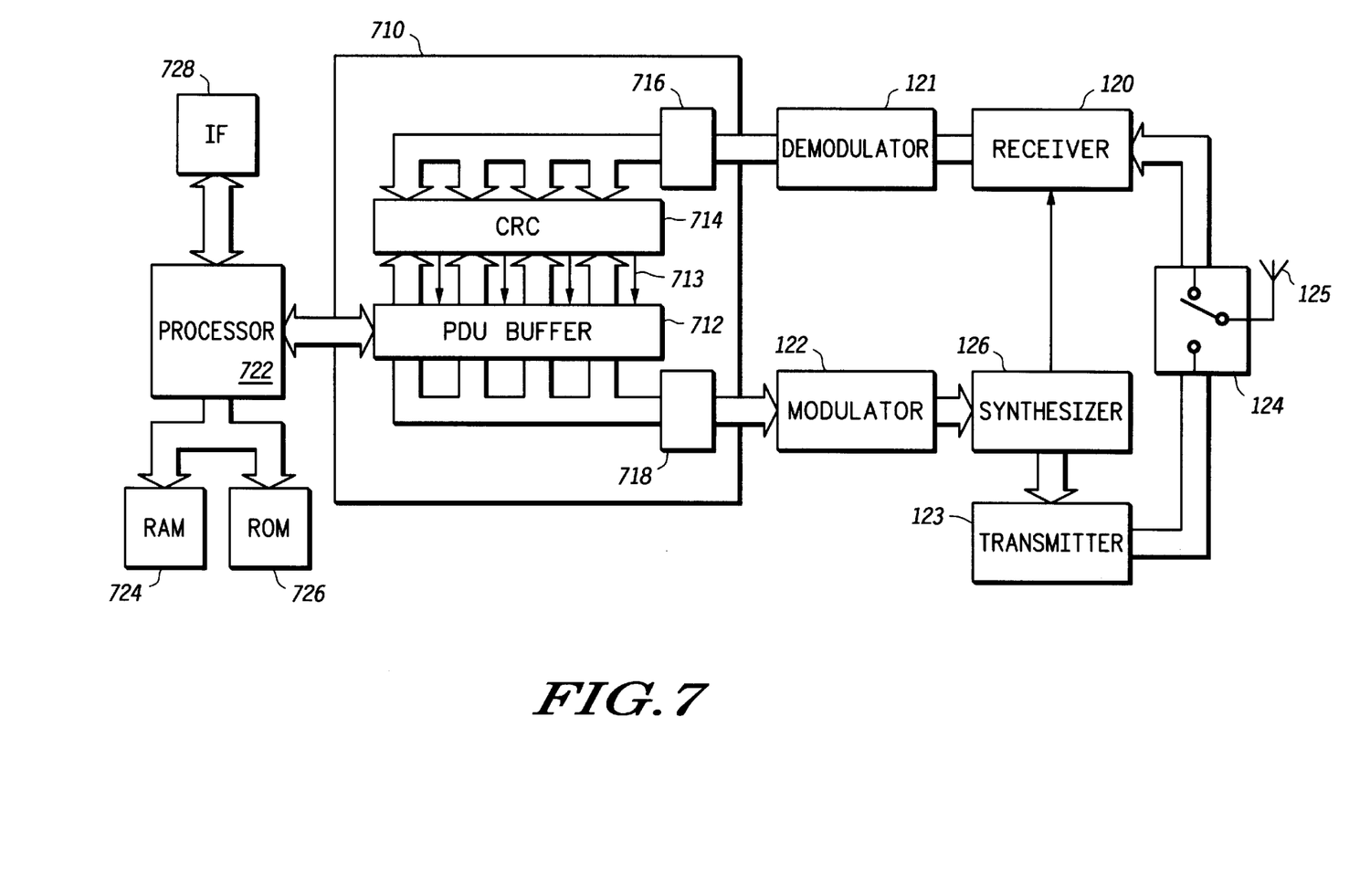
FIG. 7 is a block diagram illustrating an embodiment of the invention alternative to the embodiment illustrated in FIG. 2.

Referring FIG. 7, elements of a corresponding transmitting device are illustrated in which elements common to the transmitting unit of FIG. 2 have the same reference numerals as are given in FIG. 2. The transmitting unit has a logic unit 710 comprising a PDU buffer 712, and a CRC generator and comparator 714, a message decoder 716 and a transmit packet assembler 718. Connected to the logic unit 710 is a processor 722 having RAM and read-only memory (ROM) 624 and 626 and an interface 728.

In operation, the NAK message generated by the receiver unit of FIG. 6 is received by the receiver 120 and decoded by message decoder 716. The various CRC elements of the message are passed to CRC generator and comparator 714. A previously transmitted PDU is prestored in PDU buffer 712 and CRC generator and comparator 714 extracts sub-portions of the contents of the PDU buffer 712 and generates CRC code for each of the sub-portions. It compares the locally generated code with the received code and determines which sub-portions of the packet where received with errors by the receiver unit. Depending upon the results of this comparison, CRC generator and comparator 714 passes a control signal over a control line such as line 713 to the PDU buffer 712 causing the PDU buffer 712 to send that portion of its contents to the transmit packet assembler 718. The transmit packet assembler 718 assembles a retransmit packet including the particular sub-portions of the original packet required to be sent and causes a retransmission packet to be retransmitted by transmitter 1, 2, 3.

FIGS. 6 and 7 are provided by way of illustration, illustrating that various elements of the transmitter unit and receiver unit can be implemented in hardware or in software and indeed hybrid arrangements can be devised. That is of no consequence, for example, where the receive packet memory space or the transmitter packet memory space is located.

These can be located in a control unit or a processor. Also, it is of no consequence whether hardware or software CRC generation is implemented.

Various modifications of the invention or of the embodiment described can readily be made by one skilled in the art without departing from the scope and spirit of the invention.

What is claimed is:

1. A communications unit comprising:
    a memory having data packet memory space for storing a data packet;
    a packet subdivider operable on the data packet stored in the data packet memory space for providing packet portions;
    an error detecting code generator having an input coupled to the packet subdivider and an output having an error detecting code corresponding to each packet portion; and
    an acknowledgement message generator having an input coupled to the output of the error detecting code generator and an output providing an acknowledgement message including the error detecting code corresponding to each packet portion from the packet subdivider.

2. A communications unit according to claim 1, wherein the acknowledgement message is a negative acknowledgement message.

3. A communications unit according to claim 1, further comprising:
    a receiver having an output;
    a processor coupled to the output of the receiver, the processor being coupled to the memory; and
    a transmitter coupled to the acknowledgement message generator.

4. A communications unit according to claim 1, wherein the packet portions are predetermined in size.

5. A device comprising memory having instructions and data stored therein that, when executed, cause a digital processor to comprise:
    a packet subdivider operable on a data packet for providing packet portions;
    an error detecting code generator having an input coupled to the packet subdivider and an output having an error detecting code corresponding to each packet portion; and
    an acknowledgement message generator having an input coupled to the output of the error detecting code generator and an output providing an acknowledge message including said_error detecting code corresponding to each_packet portion from the packet subdivider.

6. A method of communication between a first communication unit and a second communication unit comprising:
    sending a packet of data from the first communication unit to the second communication unit;
    at the second communication unit:
        detecting that the packet as received is incorrect;
        dividing the packet into portions;
        computing a first error detection code for each portion; and
        sending to the first communication unit a negative acknowledgement
        message including the first error detection code for each portion; and
    at the first communication unit:
        receiving the negative acknowledgement message;
        dividing the packet of data into portions;
        computing a second error detection code for each portion;
        comparing the second error detection code for each portion with the first
        error correction code for each portion;
        identifying any portions for which corresponding error detection codes do not match as being portions identified as bad portions; and
        resending the portions identified as bad portions.

7. The method of claim 6, further comprising the steps of receiving portion(s) identified as resent portion(s) and reassembling the packet.

8. The method of claim 7, further comprising, at the second communication unit:
    computing an error detection code for the packet following the step of reassembling the packet;
    detecting whether the packet is correct following the step of reassembling; and
    transmitting an acknowledgement if the packet is correct.

9. The method according to claim 7, further comprising, at the second communication unit:
    if the packet is not correct following the step of reassembling the packet, detecting correctness of each received portion; and transmitting a message including an indication of received portions that are not correct.

10. The method according to claim 7, further comprising, at the second communication unit:

if the packet is not correct following the step of reassembling the packet, detecting correctness of each received portion; and if no portion is detected as incorrect, transmitting a message requesting a resending of the packet.

11. A method of operation of a first communication unit in communications with a second communication unit comprising:

receiving data from the second communication unit;

detecting that the data as received is bad;

dividing the data into portions;

computing a first error detection code for each portion; and sending to the second communication unit an acknowledgment message including the first error detection code for each portion.

12. A method of operation of a first communication unit in communications with a second communication unit comprising:

sending a packet of data to the second communication unit, the packet of data comprising a plurality of portions;

receiving a negative acknowledgement including first error detection codes corresponding to said portions;

computing a second detection code for each portion;

comparing the computed second error detection code for each portion with the first error detection code for that portion;

identifying any portions for which corresponding error detection codes do not match as being portions identified as bad portions; and resending the portions identified as bad portions.

13. A communications unit comprising:

a memory having data packet memory space;

a processor coupled to the memory;

a receiver having an output coupled to the processor, the output providing an acknowledgment message including error codes corresponding to a plurality of packet portions as received;

a transmitter having an input coupled to the processor;

the processor further including:

a packet divider having an input coupled to the data packet memory space and an output providing packet portions;

an error code generator coupled to the output of the packet divider for providing error codes corresponding to the packet portions; and a comparator coupled to the receiver and the error code generator for comparing error codes corresponding to a plurality of packet portions as received and error codes corresponding to the packet portions.

* * * * *